(12) United States Patent
Banga et al.

(10) Patent No.: US 8,195,929 B2
(45) Date of Patent: Jun. 5, 2012

(54) CONTROLLING FILE SYSTEMS SHARING AMONG TWO OR MORE OPERATING SYSTEM

(75) Inventors: Gaurav Banga, Cupertino, CA (US); Richard Bramley, Mansfield, MA (US); Dileep Venkata Rao Madhava, Mysore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 12/549,294

(22) Filed: Aug. 27, 2009

(65) Prior Publication Data
US 2011/0055536 A1 Mar. 3, 2011

(51) Int. Cl.
*G06F 9/24* (2006.01)
*G06F 12/00* (2006.01)
*G06G 15/177* (2006.01)
(52) U.S. Cl. .................................. 713/2; 713/1; 707/821
(58) Field of Classification Search .................. 713/1, 2; 707/821
See application file for complete search history.

(56) References Cited

U.S. PATENT DOCUMENTS

| 7,353,240 B1* | 4/2008 | Takamoto et al. .................... 1/1 |
| 7,516,319 B2 | 4/2009 | Chen |
| 7,546,449 B2 | 6/2009 | Wu |
| 2004/0039950 A1* | 2/2004 | Okamoto et al. ............. 713/300 |
| 2005/0066145 A1 | 3/2005 | Han et al. |
| 2005/0216722 A1 | 9/2005 | Kim et al. |
| 2006/0155669 A1* | 7/2006 | Huang et al. ...................... 707/1 |
| 2007/0005661 A1* | 1/2007 | Yang ............................. 707/200 |
| 2008/0005489 A1* | 1/2008 | Watkins et al. ............... 711/147 |
| 2009/0064195 A1* | 3/2009 | Chin et al. .................... 719/319 |

OTHER PUBLICATIONS

Microsoft TechNet "How Volume Shadow Copy Service Works", Mar. 28, 2003, (http://technet.microsoft.com/en-us/library/cc785914.aspx).
International Searching Authority, Internationai Search Report and Written Opinion, Appln No. PCT/US2010/046905, date of mailing Apr. 28, 2011, pp. 9.

* cited by examiner

*Primary Examiner* — Vincent Tran

(57) ABSTRACT

Methods, systems, apparatuses and program products are disclosed for managing, activating and controlling file systems sharing among two or more O/S (Operating Systems) and/or the like within a computing apparatus or within a single computer operational session or context.
Provision is made for journaling and resynchronization of file systems even where at least one of the O/Ses has no features for taking account of the presence of the other O/S.

18 Claims, 5 Drawing Sheets

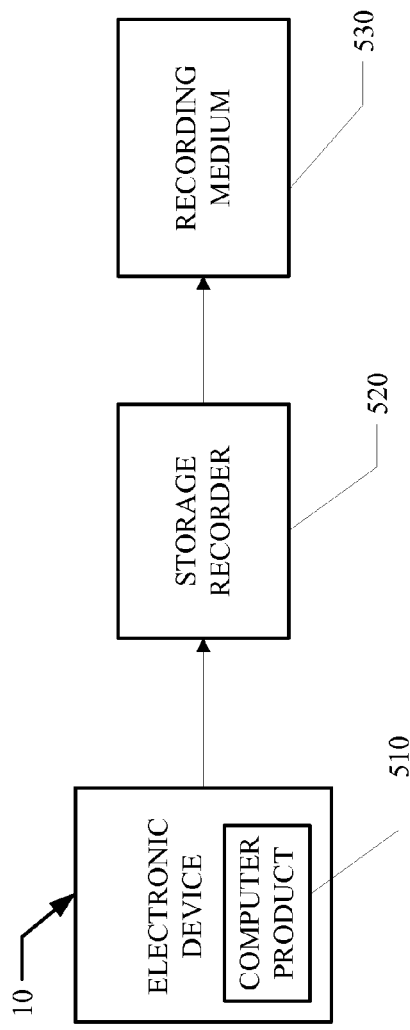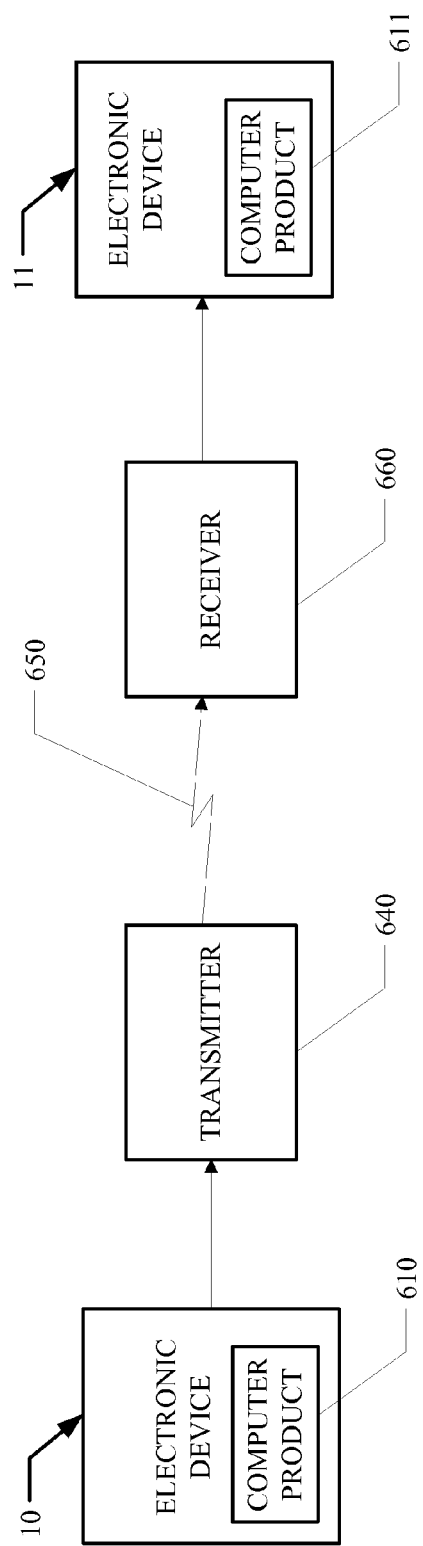

2

CONTROLLING FILE SYSTEMS SHARING AMONG TWO OR MORE OPERATING SYSTEM

RELATED APPLICATIONS

None

FIELD OF THE INVENTION

The present invention generally relates to personal computers and devices sharing similar architectures and, more particularly relates to a system and corresponding method for managing, activating and controlling file systems sharing among two or more O/S (Operating Systems) and/or the like within a computing apparatus or within a single computer operational session or context.

BACKGROUND OF THE INVENTION

Modernly, the use of PCs (personal computers), increasingly including so-called laptop and notebook computers, is increasingly common and the computers themselves are of increasing computer powerful, decreasing thermal power and ever more complex.

Older PCs have had a single, and overarching, control software, usually a Windowing O/S (Operating System) for example Microsoft® Vista® (a commercial product) or Linux® with GNOME (an open source program).

Commercial Windows® products and open source O/Ses each have distinctive advantages, increasingly buyers of laptop computers wish to have, and use both. Simultaneous provision of multiple O/S program products on a single computer raises various challenges including multi-boot, ACPI supported loading and virtualization hypervisor programs with associated hardware support.

Another issue arises as to sharing data, and hence sharing FS (file systems), across O/Ses. This is particularly a problem where multiple O/Ses operate either in effective simultaneity or continually and alternately within a single operating session. Typically, for a PC, an operating session is from POST (Power-on Self Test) through to orderly O/S shutdown, and usually a power-off sequence. Mutexes, resource locking and similar techniques are well-known in computing where multiple entities (execution threads, processor cores, distributed processors etc) need to share data file resources effectively. Such situations in computing have commonly been resolved by co-operative software procedures to ensure orderly resource sharing, or at least orderly resource allocation. However a closed source O/S cannot be expected to facilitate resource sharing with another O/S when it has (by design) no awareness of that other O/S.

A less general solution is required where files are to be concurrently or have alternating availability between two or more O/Ses and the present invention addresses at least one such situation. In particular, where a closed source O/S implements advanced or sophisticated data handling features, for example journalizing or checkpoint/rollback, then it may appear to be not well-behaved (or at least not behaving in a well understood manner) to the other O/S. The present invention addresses one particularly commonplace situation, and more.

Previous solutions have included making each O/S take complete control of its own FS (file system) which is then seen as RO (read-only) from the other O/S. Not only is that unduly restrictive in its capabilities, but it may not even produce consistent results when a FS is left mid-session in an odd or otherwise undocumented state by an O/S that has the FS open for RW (read-write). In some cases such a FS may even be detected as un-mountable (or corrupted), even for RO, outside the context of the O/S that has RW access to it.

A significant advantage of embodiments of the invention over previously developed solutions is that it becomes possible to switch execution to and fro between more than one O/S without the need to shut down and restart file systems (and by implication restart operating systems) between switches of O/S context within a single operating session.

SUMMARY OF THE INVENTION

The present invention provides a method for operating a computer and also an apparatus that embodies the method. In addition program products and other means for exploiting the invention are presented.

According to an aspect of the present invention an embodiment of the invention may provide for loading two O/Ses, mounting a first FS (file system) controlled by the second O/S and for read-only access by the first O/S, mounting a journal controlled by the first O/S. Further, redirecting, to the journal, data written from an application program under the first O/S, then resuming execution of the second O/S and applying the journal to the first FS in the context of the second O/S.

An advantage and/or feature provided by or resulting from implementing the present invention is that files may be used within a single file system by two O/Ses alternately as one becomes suspended and the other becomes active.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which:

FIG. 5 shows how an exemplary embodiment of the invention may be encoded onto a computer medium or media; and FIG. 6 shows how an exemplary embodiment of the invention may be encoded, transmitted, received and decoded using electromagnetic waves.

DETAILED DESCRIPTION OF THE INVENTION

Figure 1:
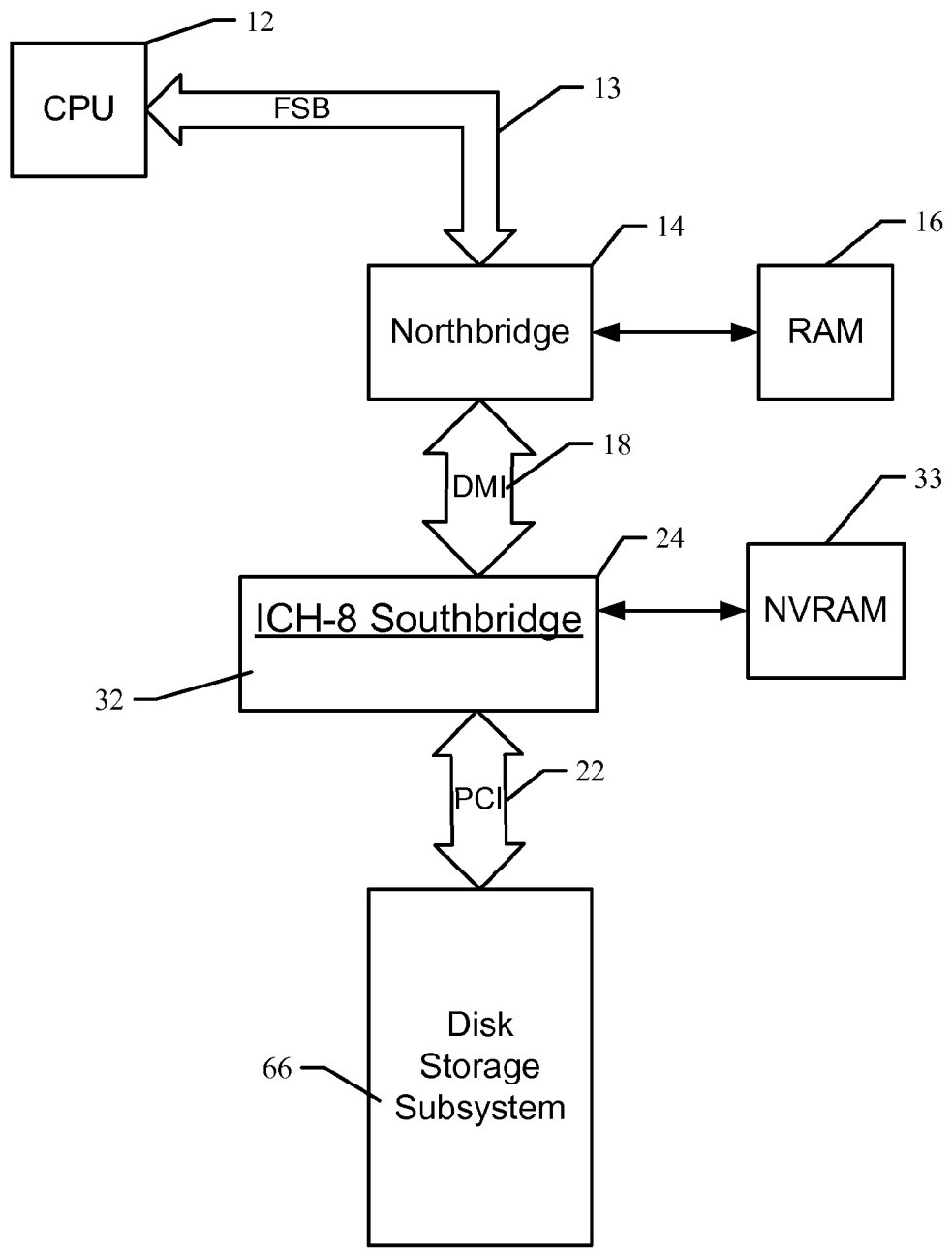
FIG. 1 is a schematic block diagram of an electronic device configured to implement the security functionality according to the present invention.

The numerous components shown in the drawings are presented to provide a person of ordinary skill in the art a thorough, enabling disclosure of the present invention. The description of well known components is not included within this description so as not to obscure the disclosure or take away or otherwise reduce the novelty of the present invention and the main benefits provided thereby.

An exemplary embodiment of the present invention will now be described with reference to the figures. FIG. 1 is a schematic block diagram of an electronic device configured to implement the security functionality according to the present invention.

In an exemplary embodiment, the electronic device 10 may be implemented as a personal computer, for example, a desktop computer, a laptop computer, a tablet PC or other suitable computing device. Although the description outlines the operation of a personal computer, it will be appreciated by those of ordinary skill in the art, that the electronic device 10 may be implemented as a PDA, wireless communication device, for example, a cellular telephone, embedded controllers or devices, for example, set top boxes, printing devices or other suitable devices or combination thereof and suitable for operating or interoperating with the invention.

The electronic device 10 may include at least one processor or CPU (Central Processing Unit) 12, configured to control the overall operation of the electronic device 10. Similar controllers or MPUs (Microprocessor Units) are commonplace. The processor 12 may typically be coupled to a bus controller 14 such as a Northbridge chip by way of a bus 13 such as a FSB (Front-Side Bus). The bus controller 14 may typically provide an interface for read-write system memory 16 such as RAM (random access memory).

In ordinary operation, CPU 12 may fetch computer instructions (also termed computer instruction codes, not shown in FIG. 1) from system memory 16. The CPU may then interpret the fetched computer instructions and operate to interpret the instructions thereby to control operation of the electronic device 10. Such use of CPU, system memory and computer instructions that typically comprise OS (Operating System) codes and other software are well known in the computing arts.

The bus controller 14 may also be coupled to a system bus 18, for example a DMI (Direct Media Interface) in typical Intel® style embodiments. Coupled to the DMI 18 may be a so-called Southbridge chip such as an Intel® ICH8 (Input/Output Controller Hub type 8) chip 24

In a typical embodiment, the Southbridge chip 24 may be connected to a PCI (peripheral component interconnect) bus 22 which may in turn be connected to a Disk Storage Subsystem 66 which may provide for various FS (filesystems) used in embodiments of the invention. This concludes discussion of FIG. 1.

The HyperSpace™ family of products from Phoenix Technologies® Ltd. enable provision of multiple O/S program products on a single computer in various ways. The HyperSpace™ product comes in several variants, notably using techniques of Dual Boot, Dual Resume, or Virtual Machines—the latter requiring hardware support far from universally found in today's laptop computer products. The Dual Boot version of the HyperSpace™ product does not provide for simultaneous loading but rather requires that a first O/S is shut down before a second O/S is loaded and allowed to take control of the PC.

The Dual Resume version of the HyperSpace™ product does facilitate concurrent loading, as directed by the HyperSpace™ product, of first and second O/Ses, for example a streamlined Linux®-like O/S and a closed-source rich-featured O/S such as one of those from a Microsoft® Corporation. Basically, in the Dual Resume version of the HyperSpace™ product, two O/Ses are concurrently loaded, but only one is selected to be active at a user level at any moment. Switching between O/S, as the name suggests, involves bringing one O/S to a quiescent state and "resuming" (reinstating) the other O/S from its formerly quiescent state into a more active state. Thus, in the described embodiment of the invention, only one O/S is active at an application level at any time.

The Dual Resume version of the HyperSpace™ product provides for limited file sharing between the two subject O/Ses. The Linux-like O/S side of the HyperSpace™ product is commonly referred to as just HS (short for HyperSpace™) and, on the other side, a selected one of any of the modern O/S products from Microsoft® Corp. is commonly termed "Windows" as a commonly-used generic term in the computing arts. This is notwithstanding Windows® also being an acknowledged registered mark of Microsoft® Corp. and X-Windows from MIT (Massachusetts Institute of Technology) being an open source program product.

A key feature of the various HyperSpace™ firmware/software products is of course that it allows FSes (and hence files) to be shared between Windows® contexts and concurrent HS (HyperSpace™'s Linux-like O/S) contexts. In the following description of particular embodiments, specific file systems that have been implemented, such as NTFS, FAT32, Windows PSA, ext3 (and so on, all of which well-known in the art) should be viewed as providing an enabling description of exemplary FSes. The invention is not generally limited to those specific O/Ses described, they are being used merely as paradigmatic examples.

A bare-bones and only barely acceptable and rudimentary implementation (borrowed from commonplace Linux® distributions) would exploit using an unmodified NTFS-3g (New Technology File System, third generation) driver to mount and access storage volumes designated as C:, D:, etc., from within a HyperSpace™ context. Using a Dual Boot technique, an implementation of this type that allows for safe read-only access (from a Linux-like O/S) of FSes created (and maintained) by Windows is barely acceptable. In a Dual Resume product such restriction is likely to be wholly unacceptable to most users.

In general, writing to FS is supported by the NTFS-3g driver, but without further precautionary and remedial measures actually using this feature could (and likely would) lead to problems arising out of the incomplete implementation by NTFS-3g of advanced features such as MS NTFS VSS (Microsoft® Inc.'s Volume Snapshot Service of NTFS) and data journalizing features. MS NTFS VSS is well-known in the art.

Part of taking the opportunity to resolve the above difficulties may involve restricting read-write access within NTFS-3g so as to provide full read-write access to only a limited subset of the subject volume. Doing so limits the scope for complication while providing full NTFS-3g access to those files deemed most likely to be the ones for which read-write access is valuable to the user. Limiting the scope in this way allows software to be kept to a minimum thus avoiding risk of consuming excessive resource.

In an embodiment of the invention read-write access of Windows® files from the HS side (running a variant of Linux®) is limited to a small, controlled part of the FS. In one particular embodiment read-write access to the "My Documents folder" is enabled. "My Documents folder" is a commonplace and well-known feature of Microsoft® software products.

Read-only access can generally be provided for all files without causing problems; however steps may need to be taken to ensure the FS of a first O/S is brought to a tidy condition when transferring control to a second O/S. The described implementations mitigate problems associated with accessing an FS (especially an NTFS) from O/S while the other O/S is suspended but which might nonetheless have pending action at an application level. These effects will be apparent to one of ordinary skill in the art.

Thus, in the exemplary HyperSpace™ Dual-Resume program product, the problems of file sharing are challenging. Situations arise in which Windows and HS are both activated even though not executing application-level programs alternately—rather than concurrently. For example this may occur when one O/S sees ACPI (Advanced Configuration and Power Interface) State S0 and the other considers itself suspended in State S3. In this case both may have a Windows-owned NTFS file system concurrently mounted, even while one of the mounting OSes is effectively suspended. Without specific measures taken to ensure consistency, there arises a risk of stale data being read and/or a corrupted Windows file system, for example when there are writes to NTFS from HS during periods in which Windows® is suspended.

Specifically, the following issues are salient and resolved in totality or in substantial part in embodiments of the invention:

(A) An 'on disk' version of a file within a file system or volume may differ from a 'not yet saved' or cached in memory version of the same file. This is a bifurcated issue—either or any O/S may own and control the file or the FS volume and may thus create an issue for the other O/S to resolve.

(B) An NTFS-3g driver may refuse to mount an NTFS volume which has not been cleanly dismounted.

(C) With a HS dual resume type product, Windows files may remain open for editing at a time of switching context to HS.

(D) Windows based NTFS implementations may include enhanced functionality that is absent from the NTFS-3g, notably including:

(I) Restore points and VSS; (II) File Indexing; (III) Use of filter drivers by AV (Audio-visual) packages; and (IV) Backup with restore facilities.

Figure 2:
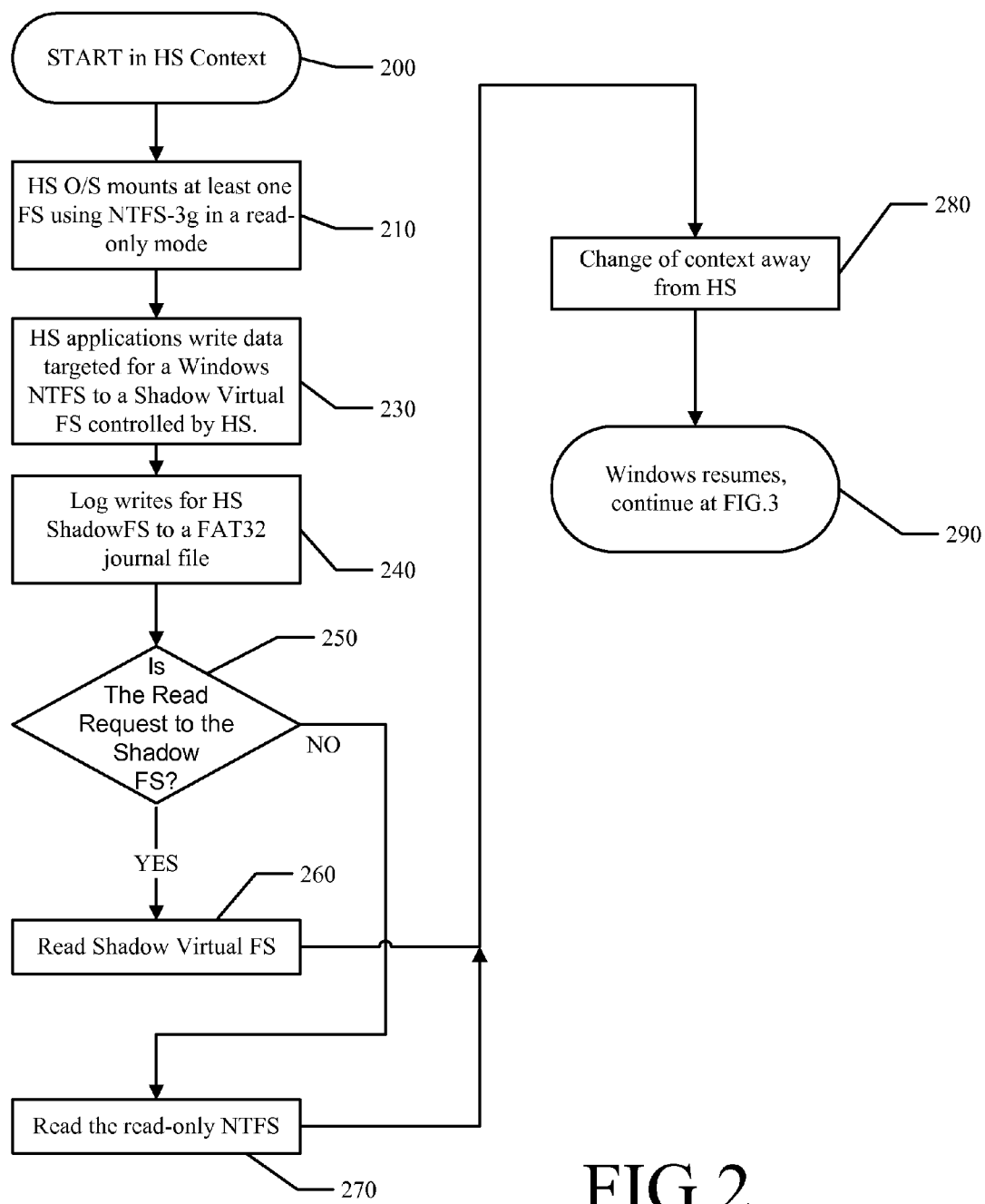
FIGS. 2 and 3 taken together form a flowchart illustrating an overview of some of the steps performed in implementing an embodiment of the present invention.

Referring to FIG. 2, in an embodiment of the invention is depicted as starting at ref. 200, in a context of an O/S, for example a Linux® based HS, a number of actions are taken. At ref. 210, HS mounts a FS using NTFS-3g in a read-only mode. This may provide access from HS for one or more (any or all of the) Windows-based FSes in the volume selected to be mounted by the NTFS-3g software subsystem. Also, Windows O/S may write to various FSes in the traditional manner, unaffected by (indeed unaware of) the presence of an active HyperSpace™ context and O/S in the computer system.

At Ref 230, any and all data written from HS applications to files within any NTFS that belongs to Windows® are written to a Shadow Virtual FS controlled and owned by HS. Volume (disk) allocation of space for the Shadow Virtual FS may be provided from within a FS that is native to HS.

At Ref. 240, writes from within HS to the Shadow Virtual FS may also be logged to a journal file. The journal may be synced to disk (cache for IDE (Integrated Drive Electronics) disk) such as on every write or such as periodically by policy every few seconds or according to comparable criteria. The journal file may be implemented within a dedicated data area on a volume, and the journal file may be also accessed from systems programs operating in a Windows® O/S or context. For example, a FAT32 (32 bit File Allocation Table) FS in a dedicated extended disk partition may be used, or a proprietary formatted journal area may implemented on top of a hidden, non-movable, contiguous Windows® scratch file.

At Ref. 250, a read request is received to be serviced in a HS context, it causes a check to be performed on the Virtual Shadow FS to determine whether the requested data is already located therein. If not then the data read request is for a requested file that is absent from Shadow Virtual FS, or the requested file is found but the particular record is not found. At Ref 260, if the request can be serviced by reading the Shadow FS then that read is performed. Otherwise, at ref. 270 the read-only NTFS is read and the file and data are located from there.

Figure 3:
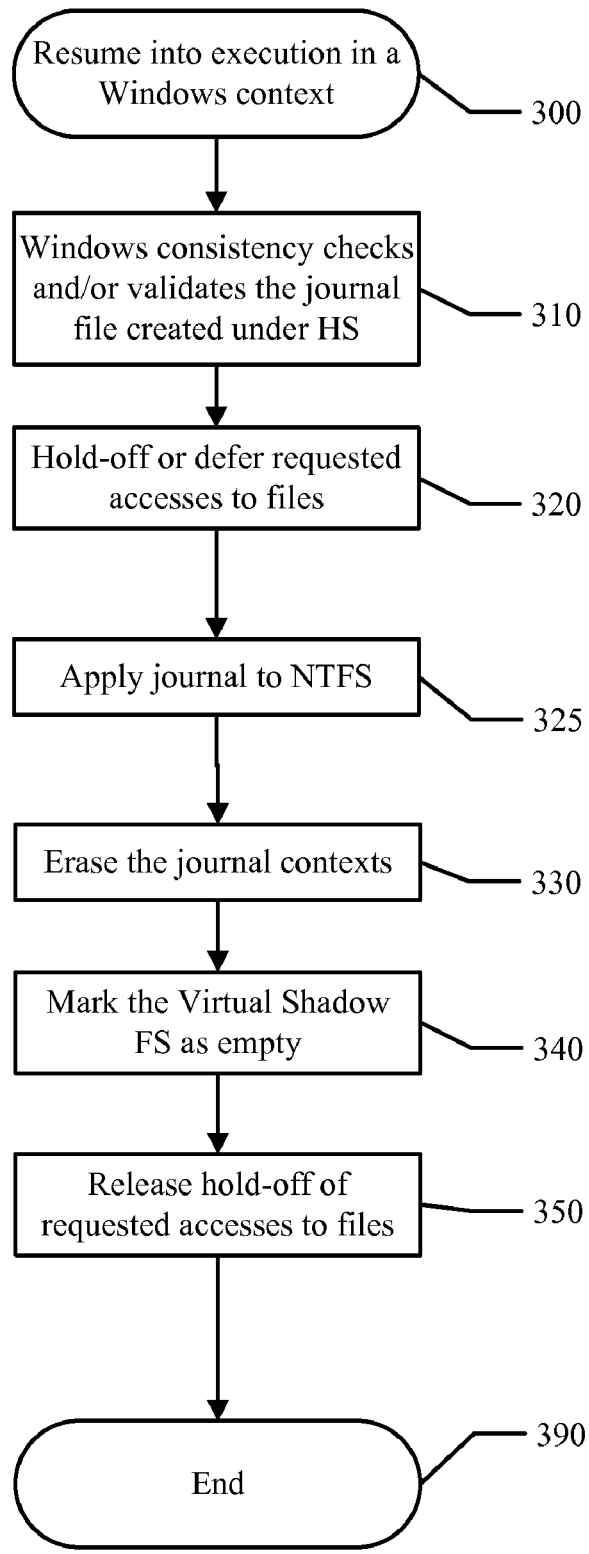

At Ref. 280 there is to be a change away from HS context, and at ref. 290 execution will continue in a Windows context, at FIG. 3.

Referring now to FIG. 3, ref. 300 is the beginning of a resume into execution in a Windows context (or upon a reboot of a Microsoft® Windows® resource partition).

At ref. 310, a Windows service (typically in the form of an application daemon) may consistency check (validate) the journal file created under HS as described above.

At Ref. 320, a filter (plug-in) program previously installed into a Windows application (such as the Explorer program) and/or a previously installed FS filter driver may hold-off (i.e. postpone or defer) requested accesses from Windows processes to certain files. Affected files are those files which are presently subject to being modified by applying the journal file. The access is held-off until after the HS write journal has been merged and fully applied (as described below).

At ref. 325, the service may then apply the journal to the NTFS file(s) and then, at ref 330, may erase the journal contexts (such as by writing data of all-zeros) and at ref. 340 may mark the Virtual Shadow FS as empty (or otherwise inapplicable as no longer containing a journal file that should be applied). This applying of a journal file essentially amounts to a catch-up of a shadow copy and ensures that later accesses (such as may be from within Windows and unaware of the shadowing) will receive only valid and fresh (i.e. non-stale) data.

At ref. 350, the holding-off or deferment of accesses that was imposed at step 320 is released. This allows pending transfers in the resumed O/S context to proceed, and any backlog that might have built up is unwound. At ref 390 the sequence of actions is completed.

Figure 4:
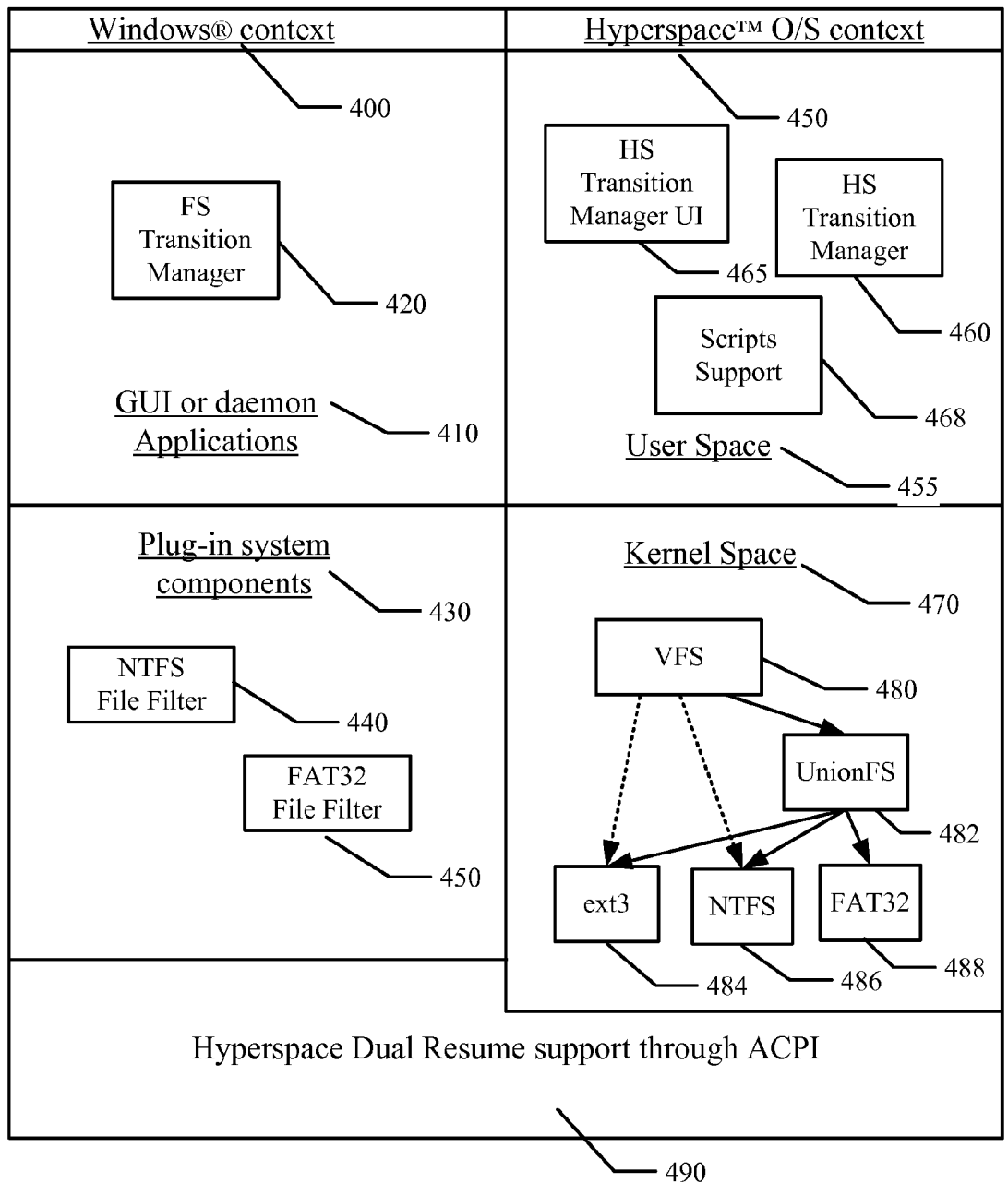
FIG. 4 is a diagram that shows relationships between certain software components of an embodiment of the invention.

FIG. 4 is a diagram that shows relationships between the software components of an embodiment of the invention. At a low level and using BIOS assistance, there is HyperSpace™ Dual Resume support through ACPI 490. Above and beyond that there are two O/S contexts, Windows® O/S context 400 and HyperSpace™ O/S context 450.

Windows® O/S context 400 is divided between components that run either as GUI (Graphical User Interface) or as daemon applications 410 and, alternatively programs that function as plug-ins, notably file system file filters.

The HyperSpace™ O/S context 450 is divided between User Space 455 and Kernel space 470.

The various software components that form an embodiment of the invention will now be described with reference to FIG. 4 throughout. The design on the Windows side 400 consists of several components: (A) NTFS File Filter 440, (B) FS Transition Manager 420, and (C) FAT File Filter 450.

NTFS File Filter 440 is a file system driver which attaches to the Windows file system stack during boot and monitors all the calls into the FS driver of Windows O/S. It plays an important role in assisting the FS Transition Manager in File Sharing.

During a switch from Windows to HS, the NTFS File Filter 440 flushes the disk cache upon notification from FS Transition Manager 420. Then NTFS File Filter 440 blocks all the FS I/Os (input-output operations) from reaching the FS by queuing up the IRPs (I/O request packets) based on file handles. The blocking is started and stopped responsive to and upon notification from the FS Transition Manager 420. The File filter blocks only read and write IRPs but allows other IRPs such as PNP IRP (Plug-n-Play IRP), Power IRP, WMI IRP (Windows Management Instrumentation IRP).

NTFS File Filter 440 plays a vital role in implementing an OpLock feature enforced upon files that are shared across the two O/Ses. An OpLock implements multiple reader and one writer mechanism. OpLock ensures the integrity of data in the cases where a file being opened in one O/S is opened for editing in other O/S. When an application requests to open a file in the shared partition, NTFS File Filter 440 traps IRPs and tries to look up the file in a log file. If there is no entry for the requested file the request is allowed. But if there is an entry then the respective application's request to open the file is denied. This technique allows FSes to be shared across O/Ses in an orderly manner while still honoring file locking in a traditional situation of two applications attempting to update the same actual file (not merely the same FS) concurrently.

In an embodiment, the log file is implemented using a UnionFS filter driver 482 (in HS) that writes (or updates) an entry to the log file whenever an application executing in the HS (i.e. in Dom0) opens a file handle. UnionFS is feature popularized in Linux® and is well-known in the art. The relevant log entry is deleted from the log file when all the references to the file handle are closed. Only the UnionFS driver (on the HS side) updates the log and the other domain (typically running Windows) the respective NTFS File Filter merely reads (i.e. it has read-only access granted).

Similarly as a corollary, the NTFS File Filter 440 also logs all the open file entries in a second log file. This log file is used by the Unions FS filter 482 for a look up that allows an application in HS to open the file for editing. Thus, in an embodiment, the presence of a respective entry in the second log acts to prevent the file from being opened in HS.

Since a logger is used to implement an OpLock—(many readers, one writer are permitted) then the respective loggers on the two O/Ses neither block nor log the file details in situations in which an application opens a file for read-only access. Moreover, a desirable consequence of having two separate loggers is that it prevents both the O/Ses mounting the same partition (for which a log is present) in a RW (read-write) mode. Thus, the "Windows log file" may be present in a shared volume that a Windows filer driver can read and write, but it is read-only from HS. Conversely, the HS log is present in the Shadow volume which HS can update or edit but is seen as read-only volume or FS to the other domain (typically the Windows side).

FS Transition Manager 420 is a Windows application and a service that is running in the background. The service application launches the Windowed application which gives any pop-up messages to the user. Service applications typically are not designed to access the GDI (Graphical display interface) function and any attempt to do that directly would be likely to fail during execution. Service applications listen to notifications from SCM (service control manager—a well-known Windows component) and also to standby and resume notification events.

FSTransition Manager 420 is a key component which performs a number of roles: (A) Launches itself during the logon phase. It mounts the Windows PSA (packaged system area) partition and hides it from the user level. (B) Whenever Windows is active, FSTransition Manager 420 listens to the trigger to change ACPI system state and upon reception, notifies NTFS File Filter 440 to flush the disk cache and temporarily block I/Os. (C) Whenever Windows resumes from standby, the application listens to the wake up notification and upon reception, performs a copy from shadow volume to the shared volume partition. Once the copy is completed, it notifies the filter driver to unblock the pending IRPs. (D) FS Transition manager 420 also mounts the Windows PSA volume upon resuming from Standby. In an embodiment of the invention the Shadow Volume is in the Windows PSA.

FAT32 File Filter 450 is a filter driver which sits in the stack of FAT32 file system. FAT32 is well-known in the art. In this design Windows PSA is used as the Shadow partition and it is a FAT32 partition. FS Transition Manager 420 mounts the partition and performs a required copy operation. Once mounted, Windows makes the partition available to the user and the user can exploit it as may be needed. To avoid any such (potentially problematic) operations on the Windows PSA, the FAT32 File Filter 450 by design blocks I/O addressed to the Windows PSA.

Turning now to the design on the HyperSpace™ side 450, in the User Space 455, are several components: (D) HS TransitionManager 460, (E) HS TransitionManager UI (user interface) 465, and (F) Scripts support 470. In Kernel space 470 lies file filters, VFS 480 (Virtual file system) and UnionFS 482. These file filters operate with FS (file systems) of various types, "ext3" 484 (the default Linux® FS), NTFS 486 and FAT32 488.

The HS Transition Manager 460 manages controlled I/O to NTFS RO (read-only) partitions. Whenever there is a transaction that doesn't require updating the disk, i.e., any RO operation, HS Transition Manager 460 reads the file from the appropriate NTFS partition and opens it in a RO mode. When any transaction that requires updating the disk then HS Transition Manager 460 opens the file from NTFS partition in RO mode, but in this case the I/O transfer (write or rewrite) is directed to the Shadow Volume which is mounted in a RW (read-write) mode instead of the I/O transfer being directed to the NTFS partition itself.

In an embodiment of the invention, the HS File Filter module may be part of the file filter for VFS 480 acting in association with UnionFS 482. The UnionFS 482 is a type of file system that takes care of merging the two mount points and performing write I/O to shadow volume 488 even though the application in user space is presented a view of write I/O having happened directly to an NTFS partition. The use of a UnionFS provides that a read operation will fetch the data appropriately, especially from the edited data on the Shadow Volume (rather than the original and unchanged data) whenever this data has been changed by a recent write operation.

The file filter for VFS 480 provides for general file access, such as directly to ext3 484 and NTFS 486 in addition to providing for the HS File Filter module capability.

The HS Transition Manager 460 reads information about the state of file that is being opened for write I/O from a metadata file (not shown in FIG. 4). The metadata file can be implemented as a feature of the log file described above or it could be separately created and maintained. The metadata file exists in NTFS partition that is mounted in RO mode. The NTFS file filter (in Windows) updates this metadata file with information about any pertinent (potentially sharable) file that is being edited or updated in Windows. Some files, such as Windows system files, may intentionally be excluded and so remain unknown to the HS application side.

The information contained in the metadata file includes filename, location in NTFS partition, present state, number of file descriptor references, and more. If a file is being opened in a write-permitting mode in HS and if HS Transition Manager 460 finds from the metadata file that this file is in a state of "Opened-in-Windows-for-editing", then HS Transition Manager 460 signals the HS Transition Manager UI 465 to display an appropriate message and the file open is disallowed.

Similarly, HS Transition Manager 460 maintains a metadata file in the shadow volume. The structure within is similar to the metadata file that exists in the NTFS partition which is updated by Windows. HS Transition Manager 460 updates this metadata file whenever a request from any HS application arrives for opening a file for writing that belongs to the NTFS partition and which is not already being edited in Windows. If the file being editing in HS is closed prior to switching context towards Windows then the entry for this file is removed from metadata file. Thus indicating to Windows that it may open this file for editing. Along with metadata, the actual file itself is saved in shadow volume. Whenever context is switched to Windows, this file is copied by Windows to its actual location on NTFS partition. This situation could particularly apply where a new file is created in a HS context and is to be made available to the Windows side. This can also be (or be regarded as) equivalent to a situation in which a journal is simply the entire file, it is an implementation details as to how this is embodied.

The HS File Filter is implemented by a Linux-style UnionFS 482 driver. UnionFS is a type of file system which sits in between VFS and an NTFS-3G driver.

UnionFS is well-known in the arts. Functionally, a UnionFS 482 simultaneously layers on top of several file systems 484, 486, 488 or sometimes on multiple directories within a single file system. UnionFS 482 overlays several directories into one single mount point. It first tries to access the file on a top branch and if unsuccessful continues on lower level branches. If the user tries to modify a file on a lower level branch that is RO, then the file is copied to a higher level read-write branch. UnionFS 482 presents a file system interface to the kernel, and in turn UnionFS presents itself as the kernel's VFS to the filesystems on which it is stacked. For reason that UnionFS presents a filesystem view to the kernel, it can be employed by user-level application(s). UnionFS intercepts operations bound for lower-level filesystems, and thus it can modify operations to present a unified view.

In embodiments of the invention, the two filesystems may be NTFS (read-only) and FAT32 shadow volume (read-write). User (user mode applications) are not allowed access to shadow volume, but as an exception HS Transition Manager 460 is so allowed. The FAT32 shadow volume 488 may be used to maintain the metadata file and new files sought to be created in the NTFS partition 486.

HS Transition Manager 460 could be implemented either (A) as a UnionFS-FUSE driver (UnionFS file system in user space) or alternatively as a UnionFS" kernel space filesystem driver. UnionFS-FUSE driver is not shown in FIG. 4 but is well-known in the art.

Scripts Support 468 provides Startup scripts which are customized to load a UnionFS kernel module. If UnionFS-FUSE were used, scripts must load a FUSE kernel module and invoke UnionFS-FUSE. And then (irrespective of whether or not UnionFS-FUSE is used) start the HS Transition Manager daemon 460 and HS Transition Manager-UI 465.

With regards to FIG. 5, computer instructions to be incorporated into an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

FIG. 6 shows how an exemplary embodiment of the invention may be encoded, transmitted, received and decoded using electromagnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electromagnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies and/or devices could also be used to construct alternative embodiments of the invention. The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of operating a computer comprising:
   loading a first O/S (operating system) into a memory;
   loading a second O/S (operating system) into the memory;
   mounting a first FS (file system) controlled by the second O/S;
   mounting the first FS for read-only access by the first O/S;
   redirecting a plurality of data written from an application program controlled by the first O/S to a journal controlled by the first O/S;
   resuming execution of the second O/S and applying the journal to the first FS in a context of the second O/S; and
   deferring a transaction for the first FS in the context of the second O/S pending completion of applying the journal to the first FS in the context of the second O/S.

2. The method of claim 1 wherein:
   the first FS is an NTFS (New Technology File System).

3. The method of claim 1 wherein:
   the resuming is pursuant to an ACPI (Advanced Configuration and Power Interface) State change.

4. The method of claim 1 wherein:
   the journal is stored in a shadow virtual file system.

5. The method of claim 1 further comprising:
   redirecting, from a union of the journal and the first FS, a plurality of data read into the application program controlled by the first O/S.

6. The method of claim 1 wherein the applying the journal to the first FS further comprises performing consistency or validity checks on the journal in the context of the second O/S.

7. The method of claim 1 wherein:
   a context continually alternates between first and second O/Ses pursuant to a plurality of ACPI State changes.

8. The method of claim 1 wherein:
   the journal is comprised within a second FS.

9. The method of claim 8 wherein:
   the first FS is of type NTFS and the second FS is of type FAT32 (File Allocation Table 32 bit).

10. A computer program product comprising:
at least one non-transitory computer-readable medium having instructions encoded therein, the instructions when executed by at least one processor cause said at least one processor to:
load a first O/S (operating system) into a memory;
load a second O/S (operating system) into the memory;
mount a first FS (file system), controlled by the second O/S, for read-only access by the first O/S;
redirect data written from an application program controlled by the first O/S to a journal controlled by the first O/S;
resume execution of the second O/S and applying the journal to the first FS in a context of the second O/S; and
defer a transaction for the first FS in the context of the second O/S pending completion of applying the journal to the first FS in the context of the second O/S.

11. The computer program product of claim 10 wherein:
the first FS is an NTFS (New Technology File System).

12. The computer program product of claim 10 wherein:
the journal is stored in a shadow virtual file system.

13. The computer program product of claim 10, wherein resuming the execution of the second O/S comprises resuming the execution of the second O/S from a quiescent state to an active state.

14. An electronic device comprising:
a controller; and
a non-transitory computer-readable medium having instructions encoded therein, the instructions when executed by the controller cause said controller to:
load a first O/S (operating system) into a memory;
load a second O/S (operating system) into the memory;
mount a first FS (file system), controlled by the second O/S, for read-only access by the first O/S;
redirect data written from an application program controlled by the first O/S to a journal controlled by the first O/S;
resume execution of the second O/S and apply the journal to the first FS in a context of the second O/S; and
defer a transaction for the first FS in the context of the second O/S pending completion of applying the journal to the first FS in the context of the second O/S.

15. The electronic device of claim 14 wherein:
the first FS is an NTFS (New Technology File System).

16. The electronic device of claim 14 wherein:
the resuming is pursuant to an ACPI (Advanced Configuration and Power Interface) State change.

17. The electronic device of claim 14 wherein:
the journal is stored in a shadow virtual file system.

18. A computer program product comprising:
at least one non-transitory computer-readable medium having instructions encoded therein, the instructions when executed by at least one processor cause said at least one processor to:
load a first operating system and a second operating system into a memory;
mount a file system, controlled by the second operating system, for read-only access by the first operating system;
redirect data written by an application program controlled by the first operating system to a journal associated with the first operating system;
resume execution of the second operating system and apply the journal to the file system in a context of the second operating system; and
defer access, by a process associated with the second operating system, of files of the file system pending completion of applying the journal to the file system in the context of the second operating system.

* * * * *